United States Patent
Rakshit et al.

(10) Patent No.: US 10,834,767 B2
(45) Date of Patent: Nov. 10, 2020

(54) DYNAMIC COMMUNICATION GROUP DEVICE PAIRING BASED UPON DISCUSSION CONTEXTUAL ANALYSIS

(71) Applicant: International Business Machines Corporation, Armonk, NY (US)

(72) Inventors: Sarbajit K. Rakshit, Kolkata (IN); John M. Ganci, Jr., Raleigh, NC (US); James E. Bostick, Cedar Park, TX (US); Martin G. Keen, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/201,058

(22) Filed: Nov. 27, 2018

(65) Prior Publication Data

US 2020/0170057 A1    May 28, 2020

(51) Int. Cl.
| | | |
|---|---|---|
| *G06F 15/177* | (2006.01) | |
| *H04W 76/14* | (2018.01) | |
| *G06F 3/16* | (2006.01) | |
| *G10L 17/22* | (2013.01) | |
| *G10L 15/18* | (2013.01) | |

(52) U.S. Cl.
CPC ............ *H04W 76/14* (2018.02); *G06F 3/165* (2013.01); *G06F 3/167* (2013.01); *G10L 15/1822* (2013.01); *G10L 17/22* (2013.01)

(58) Field of Classification Search
CPC ......... H04W 76/14; G06F 3/165; G10L 17/22
See application file for complete search history.

(56) References Cited

U.S. PATENT DOCUMENTS

| | | | |
|---|---|---|---|
| 8,204,751 B1* | 6/2012 | Di Fabbrizio | ........ G06F 17/271 |
| | | | 704/256 |
| 9,307,564 B2 | 4/2016 | Kim et al. | |
| 9,420,108 B1* | 8/2016 | Bostick | ............... H04L 65/4015 |
| 9,432,818 B2 | 8/2016 | Yu et al. | |
| 9,853,826 B2 | 12/2017 | Shuman et al. | |
| 10,089,067 B1* | 10/2018 | Abuelsaad | .......... G10L 15/1815 |
| 2007/0067400 A1* | 3/2007 | Kawakami | ........... G06Q 10/107 |
| | | | 709/206 |
| 2009/0031258 A1* | 1/2009 | Arrasvuori | .............. G06F 3/017 |
| | | | 715/863 |

(Continued)

OTHER PUBLICATIONS

Tero Jokela et al., FlexiGroups: binding mobile devices for collaborative interactions in medium-sized groups with device touch. Proceedings of the 16th international conference on Human-computer interaction with mobile devices & services, pp. 369-378.

*Primary Examiner* — Richard G Keehn
(74) *Attorney, Agent, or Firm* — Garg Law Firm, PLLC; Rakesh Garg; Brian Restauro

(57) ABSTRACT

Pairing user devices includes receiving an indication of a group of co-located users, receiving information indicative of a topic of conversation of a subgroup of the co-located users, and determining a topic of the discussion using contextual analysis. One or more users of the subgroup of co-located users are identified. Each of the one or more users has a user device associated therewith. The one or more users is added to a communication group associated with the topic. A subset of the user devices for a pairing between the user devices are determined. The pairing between the subset of the user devices is initiated.

17 Claims, 6 Drawing Sheets

(56) References Cited

U.S. PATENT DOCUMENTS

| | | | |
|---|---|---|---|
| 2011/0269437 A1* | 11/2011 | Marusi | G06F 16/9577 |
| | | | 455/414.1 |
| 2012/0290950 A1* | 11/2012 | Rapaport | H04N 21/8358 |
| | | | 715/753 |
| 2013/0054010 A1* | 2/2013 | Holman | G06Q 10/10 |
| | | | 700/232 |
| 2014/0046664 A1 | 2/2014 | Sarkar et al. | |
| 2014/0338002 A1* | 11/2014 | Kau | G06F 21/62 |
| | | | 726/28 |
| 2016/0164813 A1 | 6/2016 | Anderson et al. | |
| 2016/0330290 A1* | 11/2016 | Flores | G06F 16/1794 |
| 2016/0379643 A1 | 12/2016 | Ito et al. | |
| 2017/0094511 A1 | 3/2017 | Na et al. | |
| 2018/0098030 A1* | 4/2018 | Morabia | H04L 65/403 |
| 2018/0279063 A1* | 9/2018 | Sun | H04M 3/568 |
| 2018/0295240 A1* | 10/2018 | Dickins | H04M 3/42221 |
| 2020/0004796 A1* | 1/2020 | Pueo Ortega | G06Q 30/02 |

* cited by examiner

DYNAMIC COMMUNICATION GROUP DEVICE PAIRING BASED UPON DISCUSSION CONTEXTUAL ANALYSIS

TECHNICAL FIELD

The present invention relates generally to a method, system, and computer program product for device pairing. More particularly, the present invention relates to a method, system, and computer program product for dynamic communication group device pairing based upon discussion contextual analysis.

BACKGROUND

Device pairing allows users of devices, such as mobile phone, to share files and other content with one another on a peer-to-peer basis. Device pairing establishes a communication link between devices to allow direct communication of information between the devices. Typically the communication link is a wireless link in which the devices are within a relatively close proximity to one another. A common pairing technology is the Bluetooth™ wireless technology standard developed by the Bluetooth Special Interest Group which provides for short range pairing of devices such as a mobile device and a headset. Near field communication (NFC) is another device pairing technology that allows for devices to establish a connection with one another by touching the devices together.

SUMMARY

The illustrative embodiments provide a method, system, and computer program product. An embodiment of a method includes receiving an indication of a group of co-located users, receiving information indicative of a topic of conversation of a subgroup of the co-located users, and determining a topic of the discussion using contextual analysis. The embodiment further includes identifying one or more users of the subgroup of co-located users. In the embodiment, each of the one or more users has a user device associated therewith. The embodiment further includes adding the one or more users to a communication group associated with the topic, and determining a subset of the user devices for a pairing between the user devices. The embodiment further includes initiating the pairing between the subset of the user devices.

In another embodiment, the information is indicative of the topic of conversation includes an audio stream representative of the discussion. In another embodiment, the audio stream is received from one or more of the user devices. In another embodiment, the audio stream is received during a passive listening of the discussion by one or more of the users devices.

In another embodiment, determining the topic of the discussion using contextual analysis includes using natural language processing.

In another embodiment, identifying the one or more users of the subgroup of co-located users includes using voice recognition to identify the one or more users.

Another embodiment further includes determining that the communication group associated with the topic does not exist, and creating the communication group associated with the topic.

In another embodiment, determining the subset of the user devices includes determining that a user associated with a user device is seeking to share content.

In another embodiment, determining whether the user is seeking to share content includes contextual analysis of the discussion to determine that the determine that the discussion is indicative of a desire to share content with the communication group.

Another embodiment further includes sharing content between the subset of user devices.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
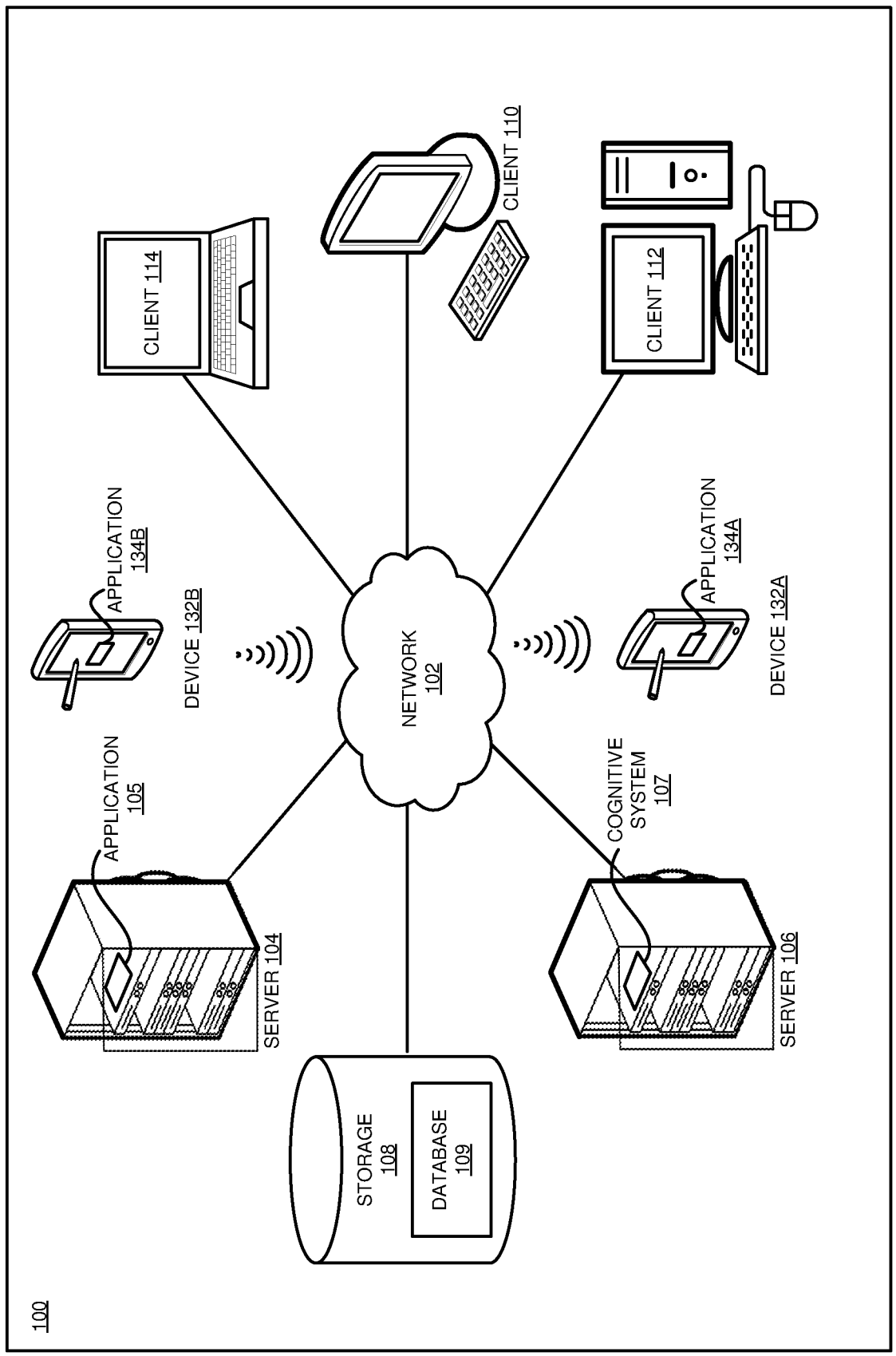
FIG. 1 depicts a block diagram of a network of data processing systems in which illustrative embodiments may be implemented.

The illustrative embodiments described herein are directed to dynamic communication group device pairing based upon discussion contextual analysis. Embodiments recognize that in many scenarios, multiple co-located people engage in discussion in a group. While the people are in the group, they can discuss various topics and create multiple ah-hoc sub-groups. Embodiments recognize that during the discussion, a need may exist for file sharing and other content sharing between the people in the group which may require device paring between user devices. Bluetooth™ technology is a common method of pairing devices whereby the user selects detected devices to initiate paring of devices or provides a key to pair the devices. Another common paring technology is near-field communication (NFC) which allows for pairing of devices by bringing the devices within close proximity to one another. Although NFC is relatively uncomplicated for the user to pair their own devices, embodiments recognize that using NFC to identify devices of other users may not be appropriate because some co-located users in groups may not be interested the pairing of their devices or be within close enough proximity to pair devices.

Various embodiments provide for a method and system to perform contextual analysis on a discussion between a group of users to determine a topic of the discussion, identify the participating users within the group using voice recognition, and create an electronic communication group associated with the topic for the group of users. In one or more embodiments, the topic of a discussion includes a subject being discussed by the group of users. In particular embodiments, the group of users are co-located and assembled to attend a common function or participate in a common meeting. In one or more embodiments, the system utilizes passive listening of the discussion from one or more user devices (e.g., mobile devices) associated with the users to receive an audio stream representative of the discussion. In one or more embodiments, the passive listening occurs when a user is not actively engaged with the user device during a communication such as a phone conversation. In one or more embodiments, the system uses contextual analysis by a cognitive system to determine the topic of discussion. In a particular embodiment, the system using natural language processing (NLP) to determine the topic of discussion.

In the embodiments, the system determines each identified user in the newly created communication group that has an associated user device (e.g., a mobile device) and is seeking to share files and/or other content. In particular embodiments, the system identifies a user seeking to share content using voice analysis to understand if a user is seeking to share content and/or other uses seeking to receive the shared content. After determining the users having associated user devices in the communication group that wish to share content, the system automatically initiates pairing of the respective user devices of these users within the communication group. After pairing, the users can begin the sharing of content with each other using the paired user devices.

An embodiment can be implemented as a software application. The application implementing an embodiment can be configured as a modification of an existing system or platform, as a separate application that operates in conjunction with an existing system or platform, a standalone application, or some combination thereof.

The illustrative embodiments are described with respect to certain types of cognitive services, cognitive applications, voice recognition procedures, tools and platforms, contextual analysis procedures and algorithms, device pairing procedures, services, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
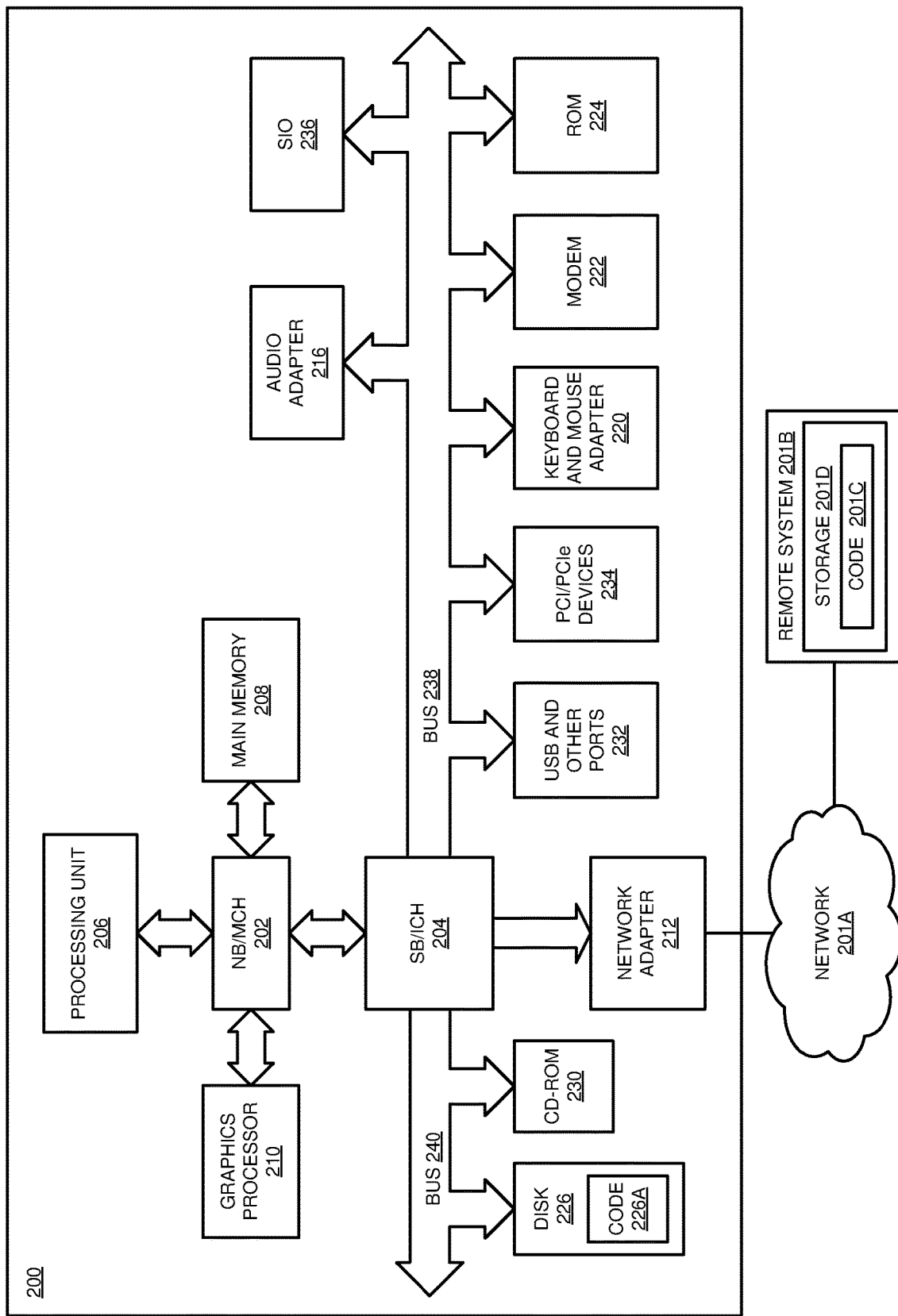
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132A and device 132B are examples of a device described herein. For example, device 132A and/or device 132B can take the form of a smartphone, a tablet computer, a laptop computer, client 110 in a stationary or a portable form, a wearable computing device, or any other suitable device. In an embodiment, device 132A and device 132B are associated with respective users who are co-located and are seeking to share content during a discussion having a common topic. Device 132A includes an application 134A, and device 132B includes an application 134B. Application 134A and application 134B are configured to perform the respective operations of the user devices described herein such as passive listening of conversations, sending audio streams of conversations to server 104, performing device pairing among user devise (e.g., device 132A and device 132B), and sharing of content with other users devices. Any software application described as executing in another data processing system in FIG. 1 can be configured to execute in device 132A and/or device 132B in a similar manner. Any data or information stored or produced in another data processing system in FIG. 1 can be configured to be stored or produced in device 132A and/or device 132B in a similar manner.

Servers 104 and 106, storage unit 108, and clients 110, 112, and 114, device 132A and device 132B may be coupled to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown. Server 104 includes an application 105 that may be configured to implement one or more of the functions described herein for dynamic communication group device pairing based upon discussion contextual analysis in accordance with one or more embodiments. Server 106 includes one or more cognitive services 107 to facilitate contextual analysis of discussion data and/or voice recognition/analysis of the discussion data as described herein with respect to various embodiments. In one or more embodiments, one or more of application 105 shown as executing in server 104 or cognitive system 107 shown as executing in server 106 may instead by executed within one or more of device 132A or device 132B in a similar manner.

Storage device 108 includes one or more databases 109 configured to store a corpus of data and/or models utilized by cognitive system 107 for performing one or more cognitive services as described herein.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
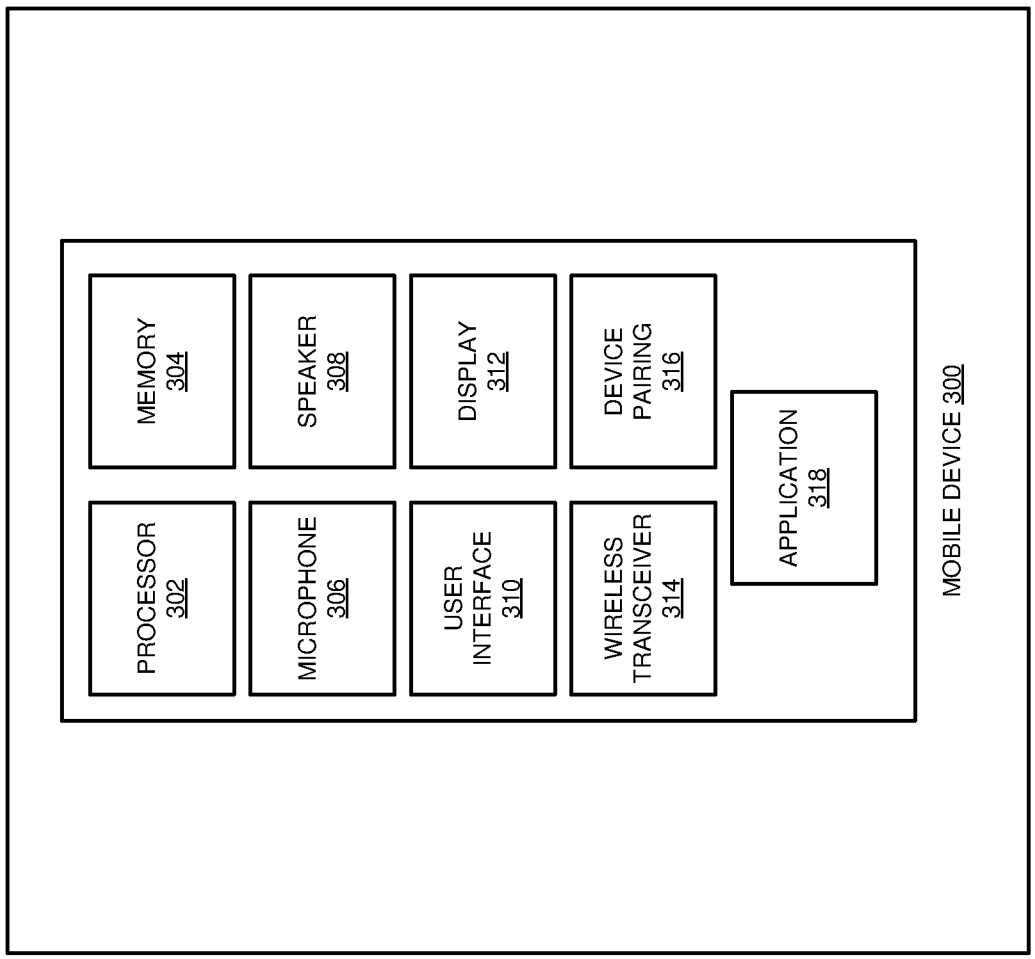
FIG. 3 depicts a block diagram of an example configuration of a user device in accordance with an illustrative embodiment.

With reference to FIG. 3, this figure depicts a block diagram of an example configuration of a user device in accordance with an illustrative embodiment. Mobile device 300 is an example of device 132A or device 132B of FIG. 1 and includes a processor 302, a memory 304, a microphone 306, a speaker 308, a user interface 310, a display 312, a wireless transceiver 314, a device pairing component 316, and an application 318.

Processor 302 is configured to retrieve instructions from memory 304 and execute the instructions to perform various operations of mobile device 300 as described herein. In one or more embodiments, microphone 306 is configured to capture audio within an environment of mobile device 300 including discussions among co-located participants of a discussion during passive listening as described herein. In one or more embodiments, speaker 308 is configured to allow a user of mobile device 300 to listen to audio content or conversations provided by mobile device 300. In one or more embodiments, user interface 310 is configured to provide one or more inputs to allow the user to interact with mobile device 300 such as initiating sharing of content with discussion participants. In one or more embodiments, display 312 is configured to present shared visual content to a user of mobile device 300.

Wireless transceiver 314 is configured to allow mobile device 300 to transmit and receive wireless signals such as mobile data or peer-to-peer data. Device pairing component 316 is configured to perform device pairing between mobile device 300 and another device for sharing of content. In particular embodiments, device pairing component 316 utilizes a connection protocol such as Bluetooth, NFC, or other suitable technology to facilitate pairing of mobile device 300 with another wireless device. Application 318 is configured stream a passive listening audio stream of a discussion to application 105 of server 104 for cognitive analysis as described herein with respect to one or more embodiments. Application 318 is an example of application 134A or application 134B of FIG. 1.

Figure 4:
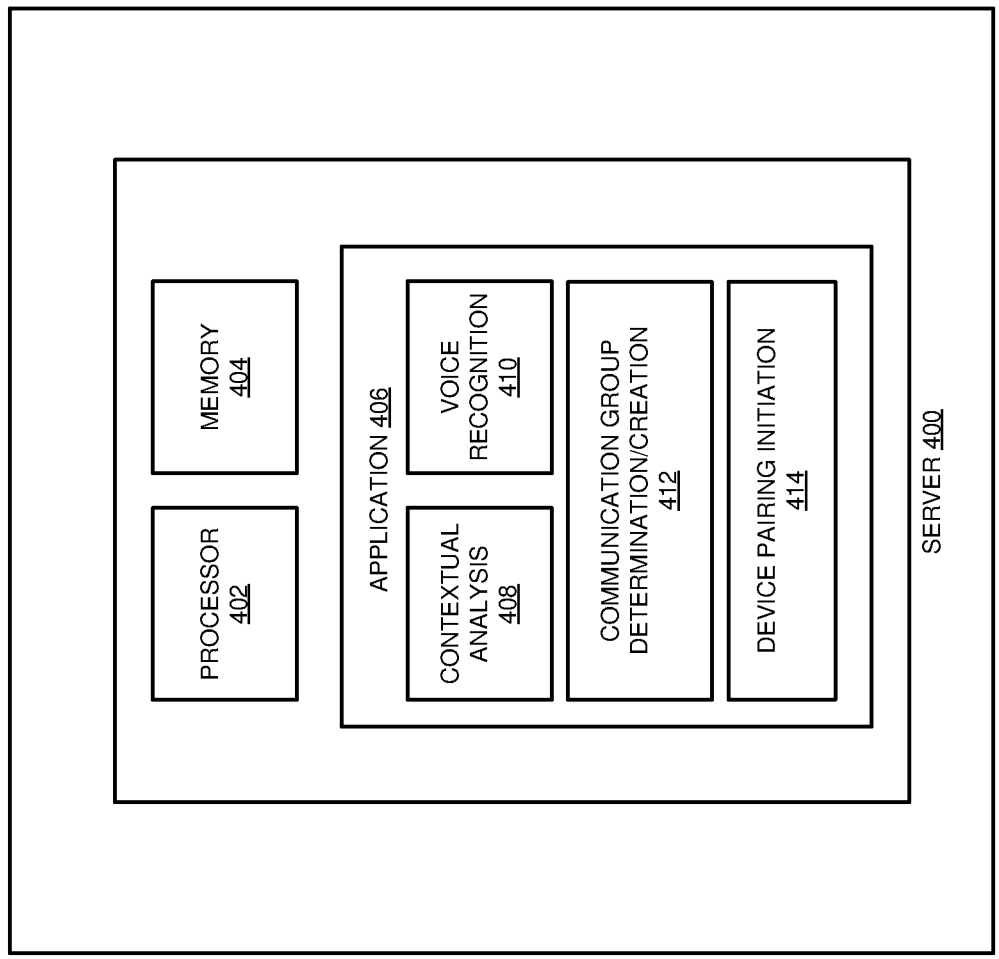
FIG. 4 depicts a block diagram of an example configuration of a server in accordance with an illustrative embodiment.

With reference to FIG. 4, this figure depicts a block diagram of an example configuration of a server in accordance with an illustrative embodiment. Server 400 is an example of server 104 of FIG. 1 and includes a processor 402, a memory 404, and an application 406. Application 406 is an example of application 105 of FIG. 1.

Processor 402 is configured to retrieve instructions from memory 404 and execute the instructions to perform various operations of server 400 as described herein. Application 406 includes a contextual analysis component 408, a voice recognition component 410, a communication group determination/creation component 412, and a device pairing initiation component 414. Contextual analysis component 408 is configured to receive audio of a group discussion captured by one or more user devices during passive listening and perform contextual analysis on the audio of the group discussion to determine a topic of the discussion and/or determine whether a particular user is seeking to share content with the group. In a particular embodiment, contextual analysis component 408 utilizes NLP techniques to determine the topic of the discussion and/or determine if a user desires to share content.

Voice recognition component 410 is configured to perform voice recognition of users to identify the users participating in the discussion using passive listening audio stream. Communication group determination/creation component 412 is configured to determine a communication group representing a subset of users based upon the identification from voice recognition for a given topic and associate the users with the communication group if the communication group already exists. If the communication group for the topic does not yet exist, communication group determination/creation component 412 is further configured to create the communication group associated with the topic and then associate the users with the communication group. Device pairing initiation component 414 is configured to automatically initiate pairing between user devices of users that are determined to be interested in sharing content based upon voice recognition and contextual analysis.

Figure 5:
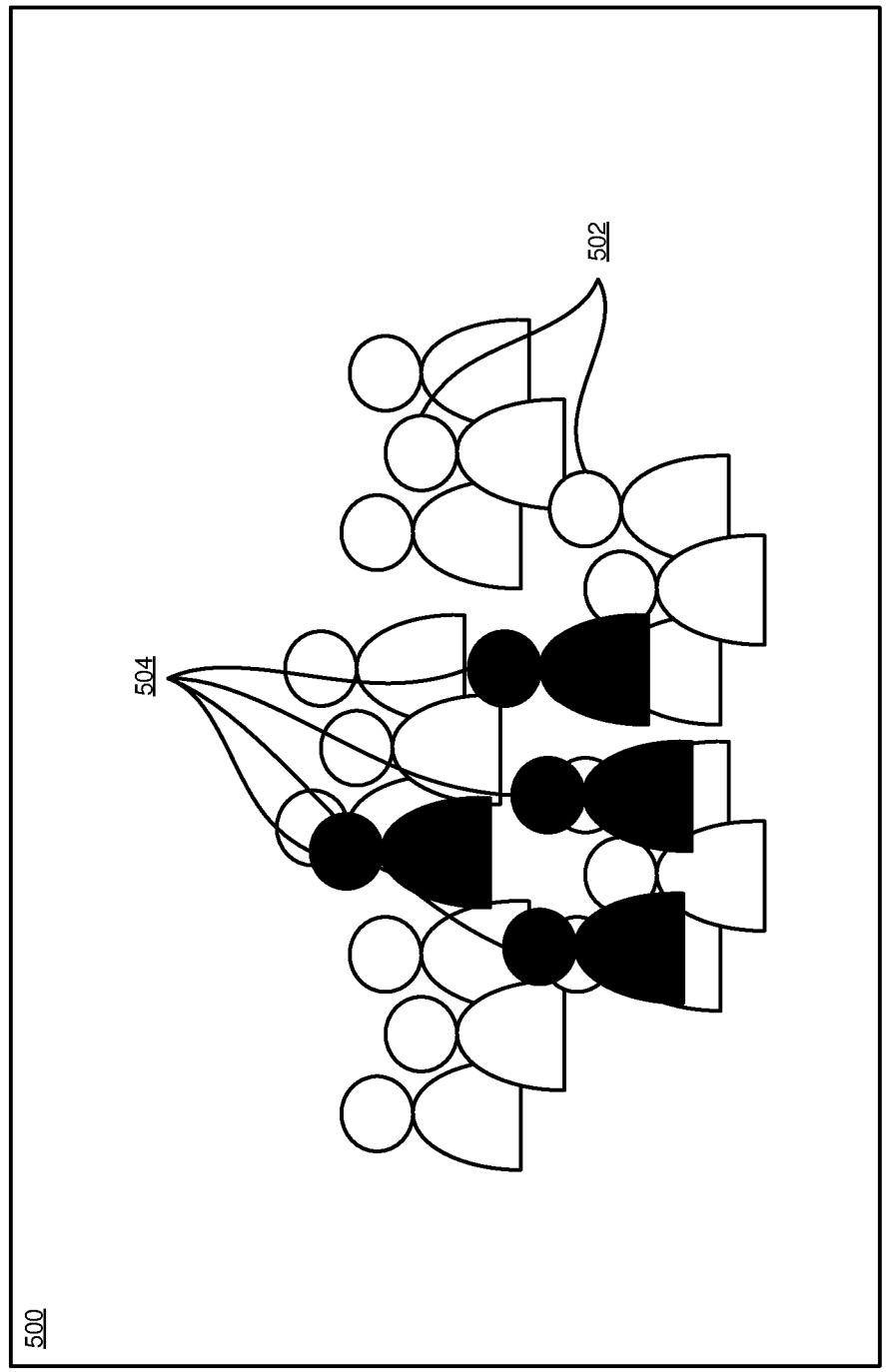
FIG. 5 depicts an example scenario of dynamic communication group device pairing based upon contextual analysis of a discussion of co-located users at a gathering in accordance with an illustrative embodiment.

With reference to FIG. 5, this figure depicts an example scenario of dynamic communication group device pairing based upon contextual analysis of a discussion of co-located users at a gathering in accordance with an illustrative embodiment. FIG. 5 depicts a number of users conducting a discussion with one another within a larger group 502 of collocated users. In an embodiment, application 105 identifies the users speaking within the group 502 about a common topic using voice recognition of streaming audio captured by one or more user devices and performing contextual analysis on the spoken content to determine the topic of discussion. Application 105 establishes a sub-group of users based on the contextual analysis of the spoken content and voice recognition to establish a sub-group of group 502 as communication group 504. Once communication group 504 is formed, application 105 identifies the users of communication group 504 that are seeking to share content based on contextual analysis spoken of the spoken content. If application 105 identifies that users are seeking to share content with communication group 504, application 105 initiates automatic device paring between user devices associated with the users seeking to share content.

In another example scenario, one hundred and forty (140) people are members of an athletic club or gymnasium. Forty (40) of the members are in a fitness contest and are required to post pictures of any workouts away from the club and all healthy meals eaten. The other one hundred (100) members are not concerned with the contest. In the example scenario, application 105 may automatically create a sub-group of the interested members participating in the contest. In the example scenario, any subsequent posting of a workout or meal away from home from club members triggers application 105 to automatically move the club member to the sub-group.

Figure 6:
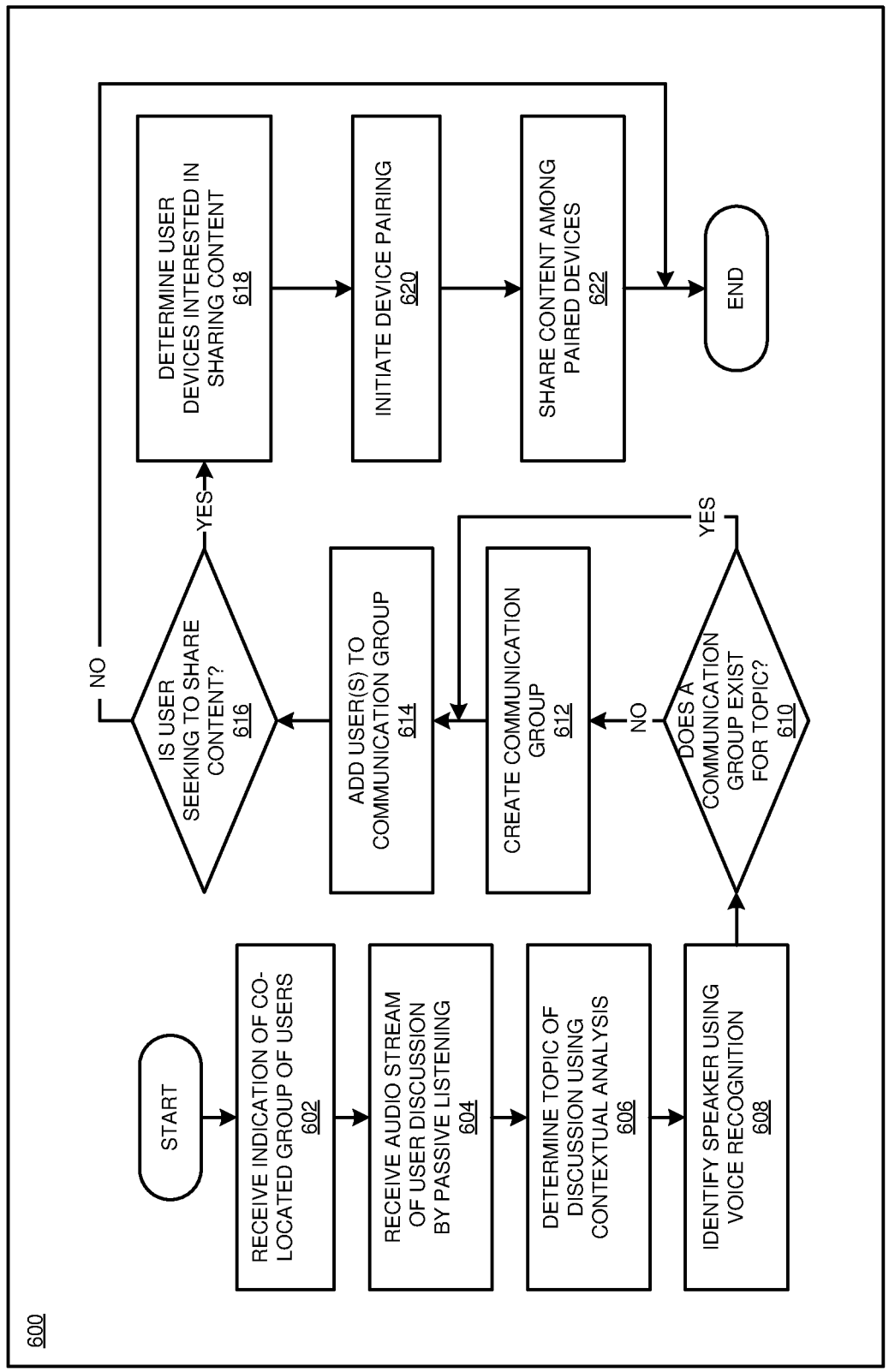
FIG. 6 depicts a flowchart of example process for dynamic communication group device pairing based upon discussion contextual analysis in accordance with an illustrative embodiment.

With reference to FIG. 6, this figure depicts a flowchart of an example process 600 for dynamic communication group device pairing based upon discussion contextual analysis in accordance with an illustrative embodiment. In the embodiment, a group of co-located users assemble for a meeting or other discussion. In the embodiment, one or more of the users have an associated user device, such as a mobile device, pre-configured to perform passive listening of discussions within an environment of the user device and stream audio of the discussions to application 105 of server 104. In an alternative embodiment, one or more voice listening devices may be located within the environment of the co-located users and configured to stream audio discussion occurring within the environment.

In block 602, application 105 receives an indication of a co-located group of users attending a common function. In a particular embodiment, application 105 receives location information from user devices associated with each of the users, and determines that the user devices are within a threshold distance from one another to identify the group of co-located users. In a particular embodiment, the location information may include global positing system (GPS) information or cellular location information. In block 604, application 105 receives one or more audio streams of a user discussion obtained by passive listening of the user discussion by the one or more user devices and sending of an audio stream representative of the discussion to application 105 by the one or more user devices.

In block 606, application 105 determines a topic of the discussion using contextual analysis of the discussion. In one or more embodiments, application 105 determines the topic of the discussion using natural language processing to determine a context of the discussion and derive the topic of discussion based upon the context. In other embodiments, application 105 may use other machine-learning processes, cognitive processes, or artificial intelligence processes to determine the topic of discussion based upon the audio stream of the discussion. In an embodiment, application 105 may utilize cognitive system 107 of server 106 to assist in determining the topic of discussion.

In block 608, application 105 identifiers each user speaking (e.g., a speaker) during the discussion from among the users in the co-located group using voice recognition. In one or more embodiments, application 105 determines an identity of a user based upon comparing audio received during the discussion to a prior training of a voice recognition system with the user's voice by the user. In one or more embodiments, application 105 attempts to identify each speaker within the discussion using voice recognition. In certain embodiments, application 105 may perform voice recognition in an iterative process to account for users joining or leaving the discussion.

In block 610, application 105 determines whether a communication group exists for the determined topic. If application 105 determines that no communication group exists for the determined topic, in block 612 application 105 creates a new communication group for the topic and process 600 continues to block 614. If application 105 determines that a communication group already exists for the determined topic, process 600 continues to block 614. In block 614, application 104 adds one or more users in a discussion associated with the determined topic to the communication group. Accordingly, a sub-group of users discussing the same topic will be grouped together in the same communication group.

In block 616, application 105 determines whether the user is seeking to share content, such as files, during the discussion with other members of the communication group. In one or more embodiments, application 105 determines whether a user is seeking to share content based upon voice analysis of the discussion audio to identify the user and contextual analysis of the discussion audio to determine that the context of the user's discussion is indicative of a desire to share content with the communication group. In one or more embodiments, application 105 uses voice analysis to gain an understanding that a user seeks to share content and identifies of participating users of the communication group seeking to receive the content. If application 105 determines that no user is interested in sharing content with the communication group, process 600 ends.

If application 105 determines that a user is interested in sharing content, process 600 continues to block 618. In block 618, application 105 determines a subset set of the user devices of the users interested in sharing content that are capable of being paired together. In a particular embodiment, application 105 determines which user devices of the users interested in sharing content are capable of being paired by determining which user devices are within range (e.g., 32 feet for Bluetooth™) of one another for device pairing. In another particular embodiment, application 105 determines which user devices are compatible for pairing with one another when determining which user devices are capable of being paired together.

In block 620, application 105 initiates device pairing between the user devices determined to be interested in sharing content and capable of pairing. In one or more embodiments, application 105 initiates pairing between the user devices by sending instructions to each of the user devices capable of being paired and determined to be interested in sharing content instructing the user device to enter a device pairing mode. In a particular embodiment, the instructions may further include identifies of one or more other user devices to which pairing is to be performed.

In block 622, after pairing of the user devices, the paired user devices share content among each other. In particular embodiments, the shared content may include one or more files. In a particular embodiment, application 105 identifies appropriate content for sharing based upon the determined discussion topic and/or context of the discussion and initiates sharing of the identified content among the paired user devices of the communication group. In another particular embodiment, a user within the communication group can choose the content that the user desires to share with paired user devices of the communication group.

In one or more embodiments, if application 105 determines that a user leaves the location of the discussion or a new user arrives at the location of the discussion, application 105 may identify and initiate new pairing for the new or changed group of users, or for users that are not currently speaking within the discussion. After completion of the discussion, process 600 then ends.

Thus, a computer implemented method, system or apparatus, and computer program product are provided in the illustrative embodiments for dynamic communication group device pairing based upon discussion contextual analysis and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
   receiving an indication of a group of co-located users each having a respective associated user device;
   receiving information indicative of a topic of discussion of a subgroup of the co-located users;
   inputting an audio stream of the discussion into a natural language processing engine configured to perform a contextual analysis on the discussion, the contextual analysis extracting the topic of discussion,
   wherein the contextual analysis comprises a machine learning process and derives the topic of discussion by determining a context of the discussion;
   determining, by performing voice analysis of the audio stream of the discussion, that a user in the subgroup intends to share a file using the user's associated user device;
   identifying one or more users of the subgroup of co-located users;
   adding the one or more users to a communication group associated with the topic;
   determining a subset of the user devices for a pairing between the user devices; and
   initiating the pairing between the subset of the user devices.

2. The computer-implemented method of claim 1, wherein the audio stream is received from one or more of the user devices.

3. The computer-implemented method of claim 1, wherein the audio stream is received during a passive listening of the discussion by one or more of the user devices.

4. The computer-implemented method of claim 1, wherein determining, by executing a contextual analysis on the discussion, the topic of discussion further includes executing at least one process of a set of processes comprising a cognitive process, and an artificial intelligence process, wherein each process of the set of processes is configured to accept the audio stream of the discussion as input.

5. The computer-implemented method of claim 1, wherein identifying the one or more users of the subgroup of co-located users includes using voice recognition to identify the one or more users.

6. The computer-implemented method of claim 1, further comprising:
   determining that the communication group associated with the topic does not exist; and
   creating the communication group associated with the topic.

7. The computer-implemented method of claim 1, wherein determining, by executing a contextual analysis on the discussion, the topic of discussion includes using a cognitive system of a server to execute a portion of the contextual analysis.

8. The computer-implemented method of claim 1, further comprising:
sharing content between the subset of user devices.

9. The computer-implemented method of claim 1, wherein determining, by executing a contextual analysis on the discussion, the topic of discussion includes executing at least one process of a set of processes comprising a cognitive process, and an artificial intelligence process, wherein each process of the set of processes is configured to accept the audio stream of the discussion as input.

10. A computer program product for dynamic communication group device pairing based upon discussion contextual analysis, the computer program product comprising:
one or more processors, one or more computer-readable memories, and one or more computer-readable storage devices, and program instructions stored on at least one of the one or more storage devices for execution by at least the one of the one or more processors via the at least one of the one or more memories, the program instructions when executed by the at least one of the one or more processors via the at least one of the one or more memories causing operations comprising:
receiving an indication of a group of co-located users each having a respective associated user device;
receiving information indicative of a topic of discussion of a subgroup of the co-located users;
inputting an audio stream of the discussion into a natural language processing engine configured to perform a contextual analysis on the discussion, the contextual analysis extracting the topic of discussion,
wherein the contextual analysis comprises a machine learning process and derives the topic of discussion by determining a context of the discussion;
determining, by performing voice analysis of the audio stream of the discussion, that a user in the subgroup intends to share a file using the user's associated user device;
identifying one or more users of the subgroup of co-located users;
adding the one or more users to a communication group associated with the topic;
determining a subset of the user devices for a pairing between the user devices; and
initiating the pairing between the subset of the user devices.

11. The computer program product of claim 10, wherein the audio stream is received from one or more of the user devices.

12. The computer program product of claim 10, wherein the audio stream is received during a passive listening of the discussion by one or more of the user devices.

13. The computer program product of claim 10, wherein identifying the one or more users of the subgroup of co-located users includes using voice recognition to identify the one or more users.

14. The computer program product of claim 10, further comprising:
program instructions to determine that the communication group associated with the topic does not exist; and
program instructions to create the communication group associated with the topic.

15. The computer program product of claim 10, wherein the program instructions are stored in a computer readable storage device in a remote data processing system, and wherein the program instructions are transferred over a network from the remote data processing system.

16. The computer program product of claim 10, wherein the program instructions are stored in a computer readable storage device in a server data processing system, and wherein the program instructions are downloaded over a network to a remote data processing system for use in a computer readable storage device associated with the remote data processing system.

17. A computer system comprising one or more processors, one or more computer-readable memories, and one or more computer-readable storage devices, and program instructions stored on at least one of the one or more storage devices for execution by at least the one of the one or more processors via the at least one of the one or more memories, the program instructions when executed by the at least one of the one or more processors via the at least one of the one or more memories causing operations comprising:
receiving an indication of a group of co-located users each having a respective associated user device;
receiving information indicative of a topic of discussion of a subgroup of the co-located users;
inputting an audio stream of the discussion into a natural language processing engine configured to perform a contextual analysis on the discussion, the contextual analysis extracting the topic of discussion,
wherein the contextual analysis comprises a machine learning process and derives the topic of discussion by determining a context of the discussion;
determining, by performing voice analysis of the audio stream of the discussion, that a user in the subgroup intends to share a file using the user's associated user device;
identifying one or more users of the subgroup of co-located users;
adding the one or more users to a communication group associated with the topic;
determining a subset of the user devices for a pairing between the user devices; and
initiating the pairing between the subset of the user.

* * * * *